United States Patent
Hara

(10) Patent No.: US 9,171,522 B2
(45) Date of Patent: Oct. 27, 2015

(54) IMAGE PROJECTION DEVICE, LIGHT/DARK-LEVEL PROCESSING METHOD, AND COMPUTER-READABLE STORAGE MEDIUM

(71) Applicant: Junichi Hara, Kanagawa (JP)

(72) Inventor: Junichi Hara, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 297 days.

(21) Appl. No.: 13/800,987

(22) Filed: Mar. 13, 2013

(65) Prior Publication Data

US 2013/0241949 A1 Sep. 19, 2013

(30) Foreign Application Priority Data

Mar. 14, 2012 (JP) ................................ 2012-057606

(51) Int. Cl.
   *G09G 5/02* (2006.01)
   *H04N 9/31* (2006.01)
   *G09G 3/00* (2006.01)

(52) U.S. Cl.
   CPC .............. *G09G 5/02* (2013.01); *H04N 9/3182* (2013.01); *H04N 9/3197* (2013.01); *G09G 3/001* (2013.01)

(58) Field of Classification Search
   CPC .............. G09G 2320/0233; G09G 2320/0625; G09G 2320/0686; G09G 2360/16; H04N 5/7408; H04N 5/7416; H04N 9/3102; H04N 9/312; H04N 9/3155; H04N 9/3179
   See application file for complete search history.

(56) References Cited

U.S. PATENT DOCUMENTS

| 2007/0071431 A1* | 3/2007 | Inoue et al. ................... 396/116 |
| 2008/0062164 A1* | 3/2008 | Bassi et al. ................... 345/214 |
| 2010/0053737 A1 | 3/2010 | Fujita et al. |

FOREIGN PATENT DOCUMENTS

| JP | 2003-015218 | 1/2003 |
| JP | 2006-162808 | 6/2006 |
| JP | 2010-085973 | 4/2010 |

OTHER PUBLICATIONS

Ulichney, R.; Sukthankar, R., "Correcting luminance for obliquely-projected displays," Consumer Electronics, 2005. ICCE. 2005 Digest of Technical Papers. International Conference on , vol., no., pp. 367,368, Jan. 8-12, 2005 doi: 10.1109/ICCE.2005.1429870. Accessed via the web @ http://ieeexplore.ieee.org/stamp/stamp.jsp?tp=&arnumber=1429870&isnumber=.*

* cited by examiner

Primary Examiner — Antonio A Caschera
(74) Attorney, Agent, or Firm — Harness, Dickey & Pierce, P.L.C.

(57) ABSTRACT

An image projection device includes an acquiring unit configured to acquire a first ratio of a second distance to a first distance. The first distance is a distance between a projecting unit that projects a projection image and a first point in a projection area on which the projection image is projected. The second distance is a distance between the projecting unit and a second point in the projection area. The image projection device also includes an estimating unit configured to estimate, using the first ratio, light/dark levels of respective division areas into which the projection area is divided; and a light/dark-level processing unit configured to perform light/dark-level processing on areas in the projection image corresponding respectively to the division areas in accordance with the corresponding light/dark level.

10 Claims, 7 Drawing Sheets

IMAGE PROJECTION DEVICE, LIGHT/DARK-LEVEL PROCESSING METHOD, AND COMPUTER-READABLE STORAGE MEDIUM

CROSS-REFERENCE TO RELATED APPLICATION

The present application claims priority to and incorporates by reference the entire contents of Japanese Patent Application No. 2012-057606 filed in Japan on Mar. 14, 2012.

BACKGROUND OF THE INVENTION

1. Field of the Invention

The present invention relates to an image projection device, a light/dark-level processing method, and a computer-readable storage medium.

2. Description of the Related Art

Conventionally, there have been known techniques of equalizing the intensity of light on a projection screen in an image projection device such as a projector that projects an image of contents. For example, there has been a technique of equalizing the intensity of light on a projection screen by designing an optical system so as to collect more light at a longer distance from a projection lens (light source).

An image projection device that projects a projection image in a diagonal direction enables projection on a large screen from a short distance. This kind of device such as an image projection device with a short focus lens as a projection lens have different distances to the projection lens in some cases by several times between screen areas, one closer to the projection lens and the other farther away from the projection lens. Thus, it is difficult to equalize the intensity of light on the projection screen with the above-mentioned technique, which has caused the deterioration of visibility of the projection image.

The deterioration of visibility of a projection image can be prevented by adjusting not the intensity of light but the projection image. For example, Japanese Patent Application Laid-open No. 2006-162808 discloses a technique in which the position of a presenter is recognized from an image obtained by capturing the presentation site with a camera, and then a projection image is projected with decreased brightness in an area on the projection image corresponding to the recognized position of the presenter.

While the above-described conventional technique aims to decrease projection light shed on the presenter, it is difficult for this technique to prevent the deterioration of visibility of the projection image due to influence of the intensity of light.

Therefore, there is a need to provide an image projection device, a light/dark-level processing method, and a computer-readable storage medium that are capable of improving the visibility of a projection image.

SUMMARY OF THE INVENTION

It is an object of the present invention to at least partially solve the problems in the conventional technology.

According to an embodiment, there is provided an image projection device that includes an acquiring unit configured to acquire a first ratio of a second distance to a first distance, the first distance being a distance between a projecting unit that projects a projection image and a first point in a projection area on which the projection image is projected, the second distance being a distance between the projecting unit and a second point in the projection area; an estimating unit configured to estimate, using the first ratio, light/dark levels of respective division areas into which the projection area is divided; and a light/dark-level processing unit configured to perform light/dark-level processing on areas in the projection image corresponding respectively to the division areas in accordance with the corresponding light/dark level.

According to another embodiment, there is provided a light/dark-level processing method that includes acquiring, by an acquiring unit, a first ratio of a second distance to a first distance, the first distance being a distance between a projecting unit that projects a projection image and a first point in a projection area on which the projection image is projected, the second distance being a distance between the projecting unit and a second point in the projection area; estimating, by an estimating unit, light/dark levels of respective division areas into which the projection area is divided, using the first ratio; and performing, by a light/dark-level processing unit, light/dark-level processing on areas in the projection image corresponding respectively to the division areas in accordance with the corresponding light/dark level.

According to still another embodiment, there is provided a non-transitory computer-readable storage medium with an executable program stored thereon. The program instructs a computer to perform acquiring a first ratio of a second distance to a first distance, the first distance being a distance between a projecting unit that projects a projection image and a first point in a projection area on which the projection image is projected, the second distance being a distance between the projecting unit and a second point in the projection area; estimating light/dark levels of respective division areas into which the projection area is divided, using the first ratio; and performing light/dark-level processing on areas in the projection image corresponding respectively to the division areas in accordance with the corresponding light/dark level.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

In the following, embodiments of an image projection device, a light/dark-level processing method, and a computer program according to the invention are described in detail with reference to the accompanying drawings. The following embodiments exemplify a case where a projector with a short focus lens is employed as the image projection device of the invention. However, the invention is not limited thereto.

First, the configuration of a projector 10 of an embodiment is described.

Figure 1:
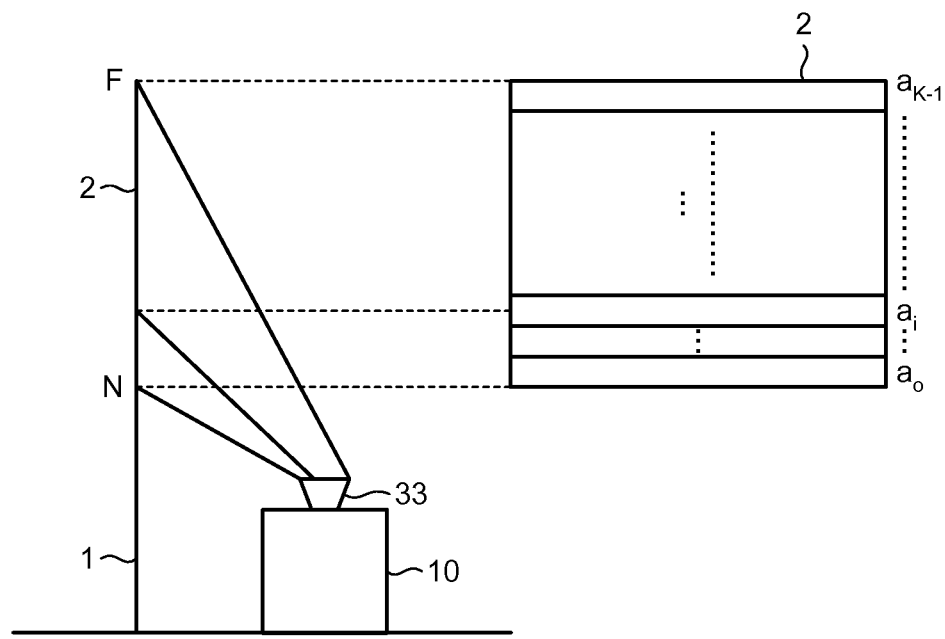
FIG. 1 is an explanatory diagram illustrating an example of a projection method by a projector of an embodiment of the present invention.
Figure 2:
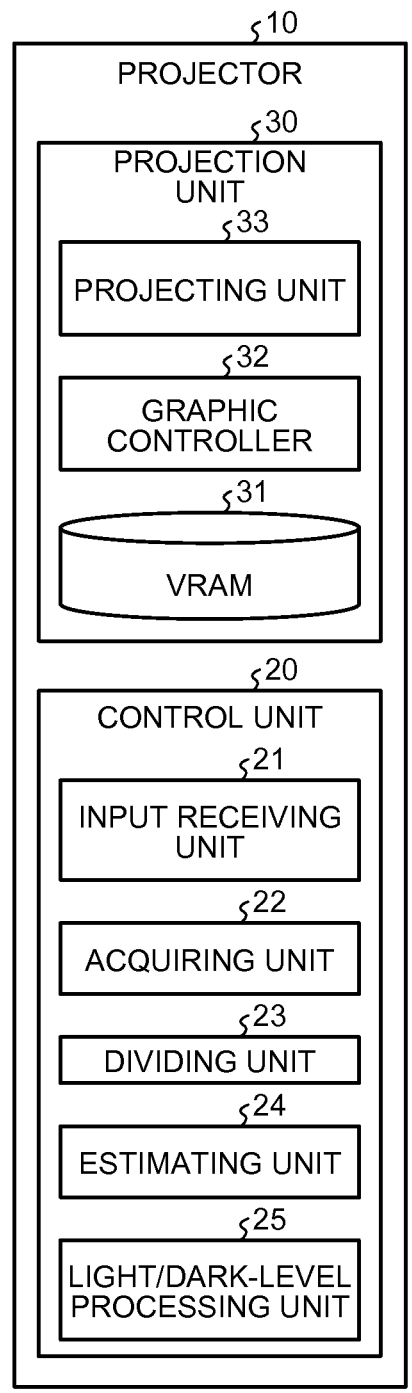
FIG. 2 is a block diagram illustrating an example of a configuration of the projector of the embodiment.

FIG. 1 is an explanatory diagram illustrating an example of a projection method by the projector 10 of the embodiment. FIG. 2 is a block diagram illustrating an example of a configuration of the projector 10 of the embodiment.

The projector 10 is a short focus projector using a short focus lens as a projecting unit 33. As illustrated in FIG. 1, the projector 10 performs projection toward a diagonally upper direction, and projects on a screen 1 from a short distance a projection image input from an information processing device (not illustrated) such as a personal computer (PC). Thus, the amount of light on an area 2 on the screen 1 on which the projection image is projected (hereinafter, referred to as a projection area 2) gradually decreases toward the upper side because the distance to the projecting unit 33 is longer.

This makes the projection area 2 darker (brightness is weakened) toward the upper side. Thus, the projector 10 projects the projection image on the projection area 2 such that the light/dark level of pixels projected on the lower side of the projection area 2 is lower, among pixels constituting the projection image. This improves the visibility of the projection image by making the brightness distribution of the projection image (projection screen) projected on the projection area 2 closer to the brightness distribution of a case where the projection image is displayed on an information processing device.

The projector 10 includes a control unit 20 and a projection unit 30, as illustrated in FIG. 2. The control unit 20 includes an input receiving unit 21, an acquiring unit 22, a dividing unit 23, an estimating unit 24, and a light/dark-level processing unit 25. The input receiving unit 21, the acquiring unit 22, the dividing unit 23, the estimating unit 24, and the light/dark-level processing unit 25 may be provided by causing a processing device such as a central processing unit (CPU) to execute a computer program, that is, by software. Alternatively, they may be provided by hardware such as an integrated circuit (IC) or by a combined use of software and hardware.

The input receiving unit 21 receives an input of a projection image as a content to be projected, from an information processing device (not illustrated) such as a personal computer (PC).

The acquiring unit 22 acquires a first ratio that is a ratio of a second distance between the projecting unit 33 that projects a projection image and a second point on a projection area on which the projection image is projected, relative to a first distance between the projecting unit 33 and a first point on the projection area.

Here, in the embodiment, the first point is a point N at which a distance to the projecting unit 33 is shortest in the vertical direction of the projection area 2, and the second point is a point F at which a distance to the projecting unit 33 is longest in the vertical direction of the projection area 2 (see FIG. 1). Moreover, the first ratio is a ratio of the long side to the short side, but the invention is not limited thereto.

In the embodiment, the first ratio is input from an input device (not illustrated) and the like, and the acquiring unit 22 acquires the first ratio input from the input device. The input device includes a knob allowing the adjustment of the first ratio. However, the acquiring unit 22 may acquire the first ratio not from the input device but from a storage device (not illustrated) preliminarily storing the first ratio. Alternatively, the acquiring unit 22 may acquire the first ratio through communication with an external device to which the first ratio can be set.

The dividing unit 23 divides the projection area 2 into a plurality of division areas in the vertical direction. Here, in the embodiment, the dividing unit 23 divides the projection area 2 into K (K≥2) areas with an equal vertical length, thereby obtaining division areas $a_0, \ldots, a_{k-1}$ (see FIG. 1). The projection area 2 is an area on which a projection image is projected, and thus an area corresponding to the projection image. Therefore, the dividing unit 23 may divide the projection area 2 so that the vertical length of the division area corresponds to a given number of lines in the projection image when the projection area 2 is mapped onto the projection image. The given number of lines may be decided depending on the accuracy of light/dark-level processing by the light/dark-level processing unit 25 to be described later, for example. The dividing unit 23 may virtually (computationally) divide the projection area 2, and does not need to divide it actually. In the embodiment, the dividing unit 23 divides the projection area 2 in the vertical direction. However, the invention is not limited thereto, and the dividing unit 23 may divide the projection area 2 not only in the vertical direction but also in the horizontal direction. That is, the dividing unit 23 may divide the projection area 2 into a lattice form.

The estimating unit 24 estimates, using the first ratio acquired by the acquiring unit 22, the light/dark level of each of the division areas. Specifically, the light/dark level is a second ratio that is a ratio of a distance between the projecting unit 33 and a division area relative to the first distance. In the embodiment, the estimating unit 24 calculates for each division area $a_i$ (0≤I≤K−1), using the ratio of the long side to the short side acquired by the acquiring unit 22, a second ratio that is a ratio of a distance between the projecting unit 33 and the division area relative to a distance between the projecting unit 33 and the point N on the projection area 2 (shortest distance along the horizontal direction of the projection area 2 to the projecting unit 33), and sets the second ratio to the light/dark level of the division area. The estimating unit 24 estimates the second ratio by linearly or non-linearly interpolating the ratio of the long side to the short side.

Figure 3:
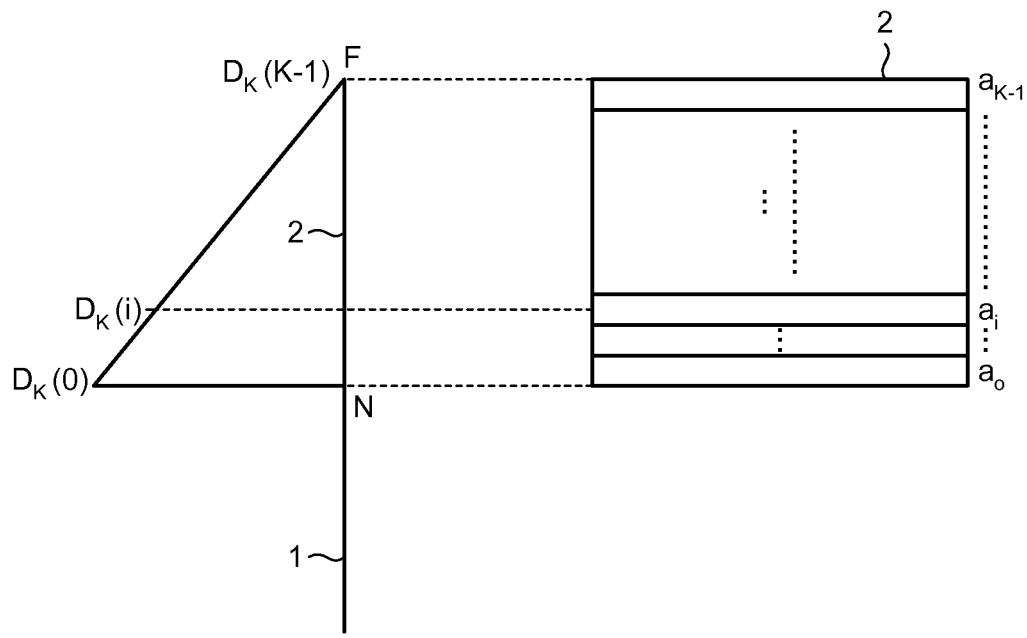
FIG. 3 is an explanatory diagram illustrating an example of a light/dark level estimation method using linear interpolation by the projector of the embodiment.

For example, when the estimating unit 24 assumes that the reduction of the amount of light (reduction of brightness) on the projection area 2 is constant, in other words, the amount of light (brightness) on the projection area 2 gradually decreases at a constant rate toward the upper side (see FIG. 3), and estimates light/dark level (second ratio) by linearly interpolating the ratio of the long side to the short side, the estimating unit 24 uses Equation (1).

$$D_k(i) = (R_{k-1} - 1/K) \times (K - i) + 1 \quad (1)$$

Here, $D_k(i)$ represents the light/dark level (second ratio) of the division area $a_i$, and $R_{k-1}$ represents a ratio of the long side to the short side.

Figure 4:
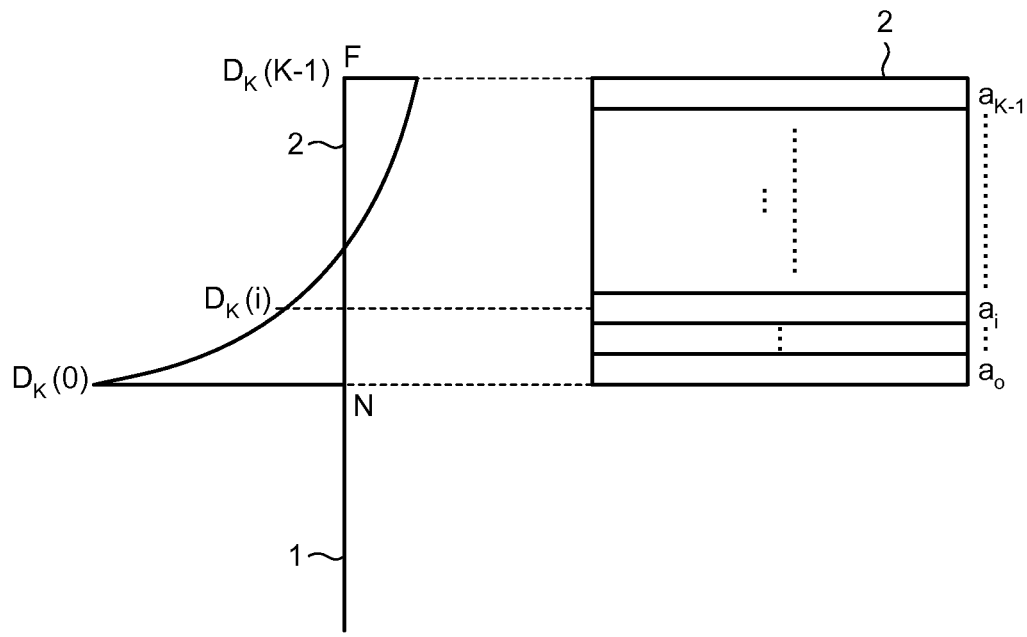
FIG. 4 is an explanatory diagram illustrating an example of a light/dark level estimation method using non-linear interpolation by the projector of the embodiment.

For example, when the estimating unit 24 assumes that the amount of light (brightness) on the projection area 2 gradually decreases in accordance with a quadratic expression toward the upper side (see FIG. 4), and estimates light/dark level (second ratio) by non-linearly interpolating the ratio of the long side to the short side, the estimating unit 24 uses Equation (2).

$$D_k(i) = (R_{k-1} - 1/K^2) \times (i - K)^2 + 1 + C \quad (2)$$

Here, C is a constant determining an offset of $D_k(i)$.

The light/dark-level processing unit 25 performs, on areas on the projection image corresponding to the division areas, light/dark-level processing in accordance with the light/dark level of the division area corresponding to the area on the projection image. In the embodiment, the light/dark-level processing unit 25 performs light/dark-level processing in accordance with the light/dark level (second ratio) $D_k(i)$ on an area on the projection image corresponding to the division area $a_i$. The light/dark-level processing unit 25 outputs the light/dark level-processed projection image to the projection unit 30.

Figure 5:
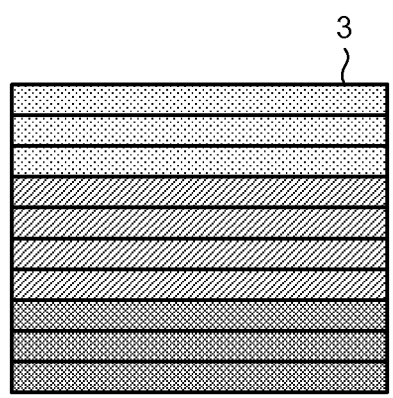
FIG. 5 is a diagram illustrating an example of a projection image light/dark level-processed by a light/dark-level processing unit of the embodiment.

FIG. 5 is a diagram illustrating an example of a projection image 3 subjected to light/dark level processing by the light/dark-level processing unit 25 of the embodiment. The light/dark level $D_k(i)$ estimated by the estimating unit 24 decreases as i increases. Thus, the light/dark-level processing unit 25 processes the projection image 3 received by the input receiving unit 21 so that pixels on the lower side are darker.

When the estimating unit 24 estimates the light/dark level $D_k(i)$ using Equation (2) and the value of $D_k(i)$ is negative (minus), the light/dark-level processing unit 25 may perform processing so that the corresponding division area $a_1$ becomes brighter. Alternatively, the light/dark-level processing unit 25 may ignore such a value of $D_k(i)$, that is, may not perform light/dark-level processing.

When the projection image received by the input receiving unit 21 is a color image, the light/dark-level processing unit 25 may convert the projection image into signal components defined in a brightness color difference space, and perform light/dark-level processing on brightness signals among the converted signal components of the projection image. Specifically, the light/dark-level processing unit 25 may convert, using Equations (3) to (5), the projection image that is an RGB image into signal components defined in a brightness color difference space, and perform light/dark-level processing on a Y image that is a brightness component. Subsequently, the light/dark-level processing unit 25 may perform YUV reverse conversion processing on the light/dark level-processed Y image so as to change the Y image to components defined in the original RGB color space (RGB image).

$$Y = (R + 2 \times G + B)/4 \quad (3)$$

$$U = R - G \quad (4)$$

$$V = B - G \quad (5)$$

Referring back to FIG. 2, the projection unit 30 includes a video random access memory (VRAM) 31, a graphic controller 32, and the projecting unit 33.

To the VRAM 31, the projection image output by the control unit 20 (light/dark-level processing unit 25) is written.

The graphic controller 32 converts the projection image written in the VRAM 31 into video signals.

The projecting unit 33 projects the video signals converted by the graphic controller 32 so as to project the projection image on the projection area 2 on the screen 1. Thus, a projection screen of the projection image is displayed on the screen 1.

The projector 10 does not necessarily have all of the above-described units as its essential components, and may have a configuration in which a part of the units is omitted.

Next, the operation of the projector of the embodiment is described.

Figure 6:
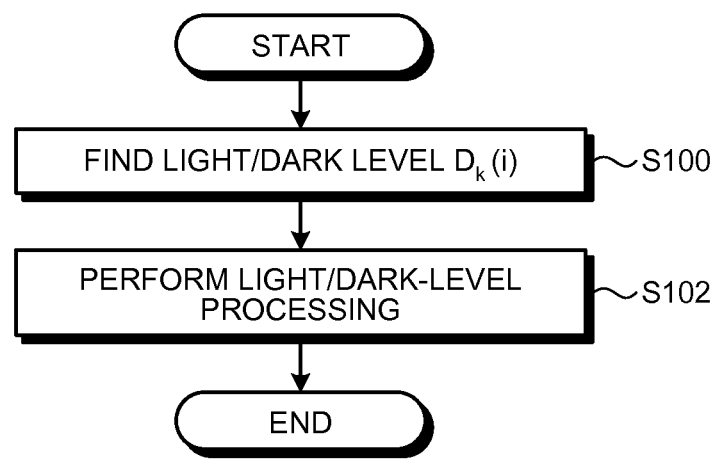
FIG. 6 is a flowchart illustrating an example of processing performed by the projector of the embodiment.

FIG. 6 is a flowchart illustrating an example of processing performed by the projector 10 of the embodiment.

First, when the input receiving unit 21 receives an input of a projection image, and the acquiring unit 22 acquires a ratio of the long side to the short side, the estimating unit 24 estimates the light/dark level $D_k(i)$ of each of the division areas $a_i$ using the first ratio (Step S100). The detail of light/dark level $D_k(i)$ estimation processing is described later. The estimating unit 24 does not need to estimate the light/dark level $D_k(i)$ each time, but only when the acquiring unit 22 acquires a ratio of the long side to the short side.

Subsequently, the light/dark-level processing unit 25 performs light/dark-level processing in accordance with the light/dark level $D_k(i)$ of an area on the projection image corresponding to the division area $a_i$ (Step S102). The detail of light/dark-level processing is described later.

Figure 7:
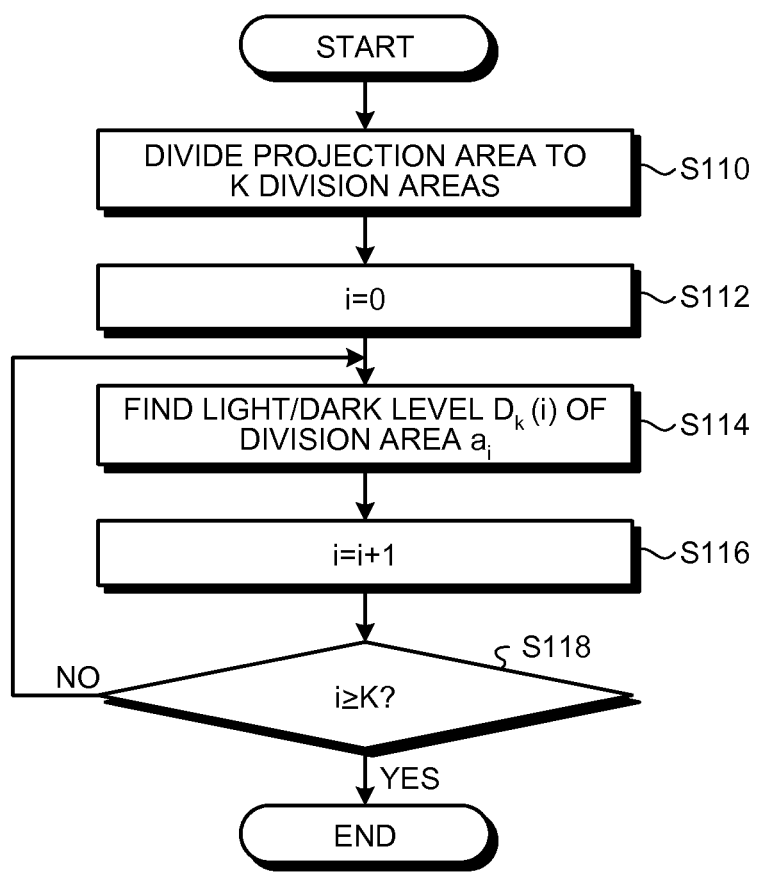
FIG. 7 is a flowchart illustrating an example of light/dark level $D_k(i)$ estimation processing performed by the projector of the embodiment.

FIG. 7 is a flowchart illustrating an example of light/dark level $D_k(i)$ estimation processing performed by the projector 10 of the embodiment.

First, the dividing unit 23 obtains the division areas $a_0, \ldots, a_{k-1}$ by dividing the projection area 2 into K ($K \geq 2$) areas with an equal vertical length of each of the division areas (Step S110).

Subsequently, the estimating unit 24 initializes the variable i to 0 (Step S112).

Subsequently, the estimating unit 24 computes the light/dark level $D_k(i)$ of the division area $a_i$ (Step S114).

Subsequently, the estimating unit 24 increments the variable i (Step S116), and repeats the processing of Step S114 and Step S116 (No at Step S118) until the value of the variable i becomes K or larger. Once the value of the variable i becomes K or larger (Yes at Step S118), the estimating unit 24 terminates the processing.

Figure 8:
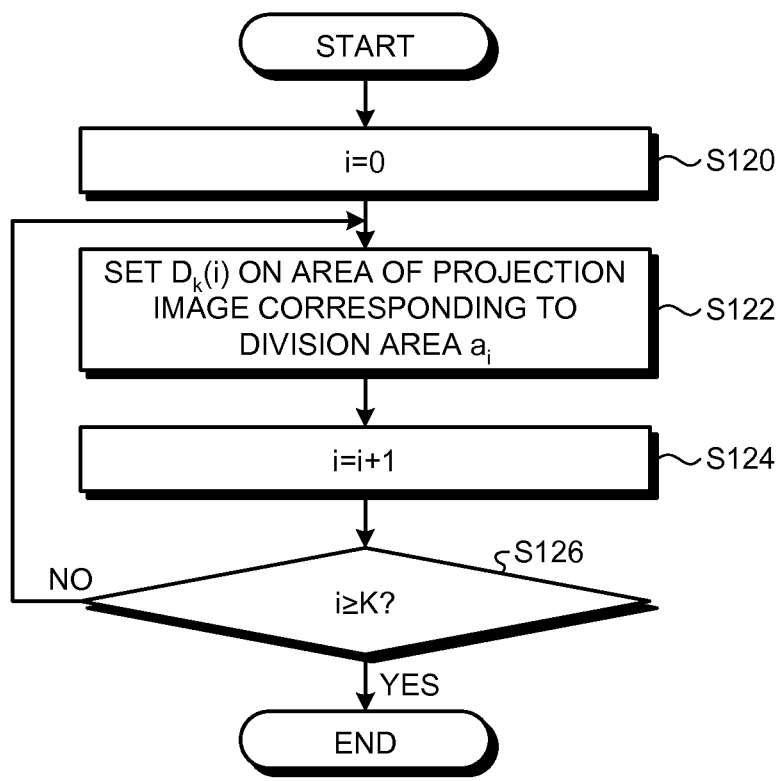
FIG. 8 is a flowchart illustrating an example of light/dark-level processing performed by the projector of the embodiment.

FIG. 8 is a flowchart illustrating an example of light/dark-level processing performed by the projector 10 of the embodiment.

First, the light/dark-level processing unit 25 initializes the variable i to 0 (Step S120).

Next, the light/dark-level processing unit 25 performs, on an area on the projection image corresponding to the division area $a_i$, light/dark-level processing in accordance with the light/dark level $D_k(i)$ (Step S122).

Subsequently, the light/dark-level processing unit 25 increments the variable i (Step S124), and repeats the processing of Step S122 and Step S124 (No at Step S126) until the value of the variable i becomes K or larger. Once the value of the variable i becomes K or larger (Yes at Step S126), the light/dark-level processing unit 25 terminates the processing.

As described above, according to the embodiment, the projection image is projected with reduced light/dark level of pixels of the projection image corresponding to a projection area having a shorter projection distance from the projecting unit and thus having a larger amount of light. This improves the visibility of the projection image by making the brightness distribution of the projection image (projection screen) projected on the projection area closer to the brightness distribution of a case where the projection image is displayed on an information processing device.

In the embodiment, specifically, it is possible to improve the visibility of a projection image, without any additional computational load, by using linear interpolation in the light/dark level calculation.

Moreover, in the embodiment, it is possible to further improve the visibility of a projection image by using non-linear interpolation in the light/dark level calculation closer to a measured value while suppressing computational load.

In the embodiment, the light/dark level is calculated using a ratio of the long side to the short side, and thus it is unnecessary to calculate an actual projection distance, facilitating light/dark-level processing.

In the embodiment, the division areas have an equal length; therefore, it is possible to easily design light/dark level.

In the embodiment, when a projection image is a color image, it is possible to efficiently perform light/dark-level processing by performing light/dark-level processing on brightness signals of a projection image.

Modifications

The invention is not limited to the above-described embodiment, and the various kinds of modification are possible.

Modification 1

The above embodiment exemplifies a case where the estimating unit 24 estimates light/dark level by linearly interpolating a ratio of the long side to the short side, assuming a constant reduction of the amount of light on the projection area 2. However, the estimating unit 24 may obtain brightness information that is information of brightness of the division areas, and calculate the light/dark level of each of the division areas using the acquired brightness information and the first ratio (ratio of the long side to the short side).

Here, the brightness information includes a measured value of the reduction of brightness on the projection area 2, and a normalized value of a simulation result thereof. The brightness information may be preliminarily stored in a storage device (not illustrated) and the like so that the estimating unit 24 acquires it from the storage device.

In this case, the estimating unit 24 estimates light/dark level using Equation (6).

$$D_k(i)=(R_{k-1}-1)T(i)+C \qquad (6)$$

Here, T(i) represents brightness information of the division area $a_i$.

In this manner, the light/dark level is calculated with a measured value. Thus, it is possible to further improve the visibility of the projection image while suppressing computational load.

Modification 2

The above embodiment exemplifies a case where the estimating unit 24 estimates light/dark level by linearly interpolating a ratio of the long side to the short side, assuming a constant reduction of the amount of light on the projection area 2. However, the estimating unit 24 may acquire a piece of brightness information corresponding to a first ratio among plural pieces of brightness information that is information of the brightness of the division areas, and calculate the light/dark level of each of the division areas using the acquired piece of brightness information.

Here, such plural pieces of brightness information include measured and simulated values of the reduction of brightness on the projection area 2 obtained under various conditions on a first ratio (ratio of the long side to the short side). In Modification 2, the first ratio (ratio of the long side to the short side) is regarded as a category. The brightness information is prepared for each category and preliminarily stored in a storage device (not illustrated) and the like so that the estimating unit 24 acquires brightness information corresponding to a first ratio (ratio of the long side to the short side) from the storage device.

In this case, the estimating unit 24 estimates light/dark level using Equation (7).

$$D_k(i)=T_s(i)+C \qquad (7)$$

Here, $T_s(i)$ is brightness information corresponding to a category of a given first ratio (ratio of the long side to the short side), and represents brightness information of the division area $a_i$.

In this manner, the light/dark level is calculated using a measured value and thus it is possible to further improve the visibility of the projection image while suppressing computational load.

Modification 3

Figure 9:
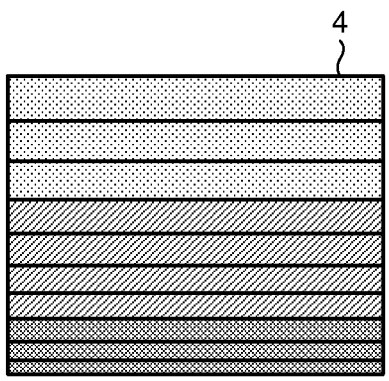
FIG. 9 is a diagram illustrating an example of a projection image light/dark level-processed by a light/dark-level processing unit of Modification 3.

In the above embodiment, the dividing unit 23 divides the projection area 2 so that the length of each of the division areas is equal. However, the dividing unit 23 may divide the projection area 2 so that a division area farther from the projecting unit 33 has a longer vertical length. With such division, the light/dark-level processing unit 25 performs light/dark-level processing on a projection image 4, as illustrated in FIG. 9.

Such division makes it possible to easily arrange linear interpolation expressions in a case where the estimating unit 24 estimates light/dark level (second ratio) by linearly interpolating a ratio of the long side to the short side.

Hardware Configuration

Figure 10:
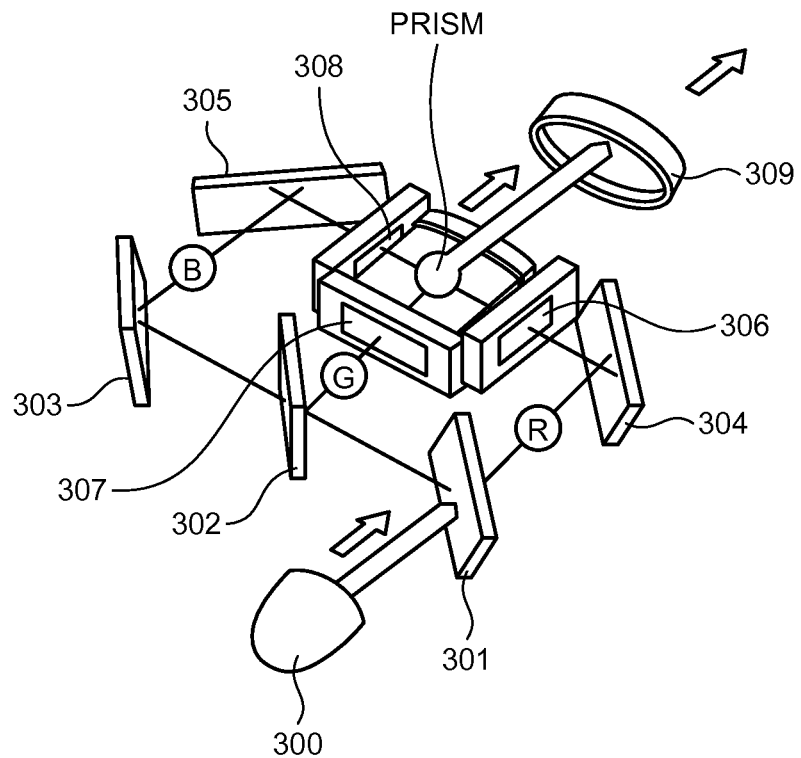
FIG. 10 is a schematic view illustrating an example of a hardware configuration of the projector in the embodiment and the modifications.

FIG. 10 is a schematic view illustrating an example of a hardware configuration of the projector 10 in the embodiment and the modifications. FIG. 10 illustrates an example in which a three liquid crystal display (3LCD) system is applied to the projector 10.

The projector 10 displays a projection image on each of an LCD 306 for red, an

LCD 307 for green, and an LCD 308 for blue. Then, the projector 10 sheds red light on the LCD 306 for red, green light on the LCD 307 for green, and blue light on the LCD 308 for blue, via a lamp 300, using a dichroic mirror 301 transmitting red light, a dichroic mirror 302 transmitting green light, a dichroic mirror 303 transmitting blue light, and mirrors 304 and 305. The beams of light of respective colors transmitting through the LCDs 306 to 308 are synthesized by a prism and are then projected by a projection lens 309 to produce a projection image on the screen 1.

Figure 11:
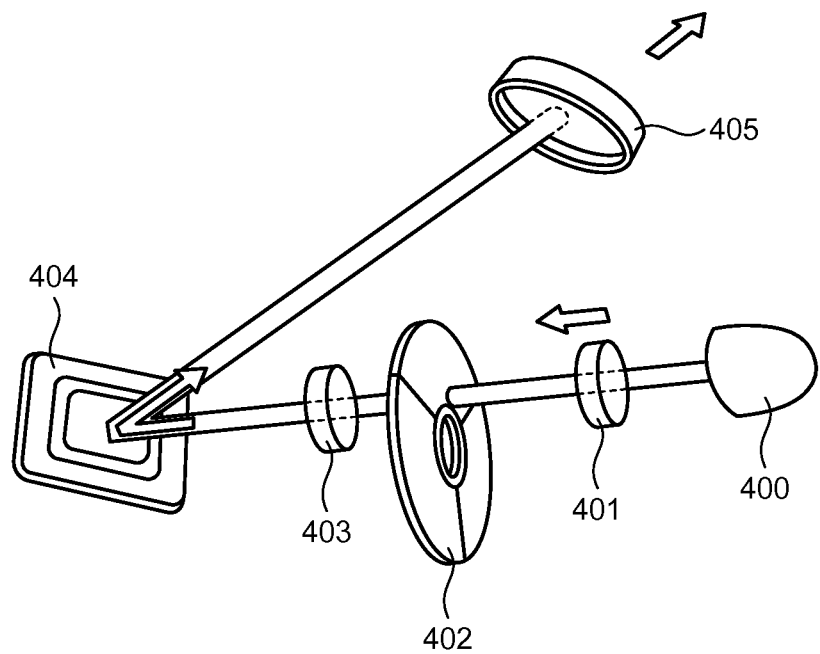
FIG. 11 is a schematic view illustrating another example of a hardware configuration of the projector in the embodiment and the modifications.

The projector 10 can be applied not only with the 3LCD system, but also with a digital light processing (DLP) system illustrated in FIG. 11. In the DLP system, light shed from a lamp 400 passes through a lens 401, a color wheel 402 having three colors of red, green, and blue, and a lens 403, before being reflected by a DLP chip 404. The reflected light is then projected by a projection lens 405 to produce a projection image on the screen 1.

The projector in the above embodiment and modifications has a control unit such as a CPU, storage units such as a read-only memory (ROM) and a random access memory (RAM), external storage devices such as a hard disk drive (HDD) and a solid state drive (SSD), a projection device such as a projector, an input unit such as a key switch, and a communication interface (I/F) such as a network interface card (NIC), and can be built with a hardware configuration of a general computer.

A computer program executed in the projector of the embodiment and the modifications is recorded and provided, as a file whose format is installable or executable, in a computer-readable storage medium such as a compact disk read-only memory (CD-ROM), a compact disk recordable (CD-R), a memory card, a digital versatile disk (DVD), and a flexible disk (FD).

The program executed in the projector of the embodiment and the modifications may be stored in a computer connected to a network such as the Internet and may be provided via download through the network. Alternatively, the program executed in the projector of the embodiment and the modifications may be provided or distributed through a network such as the Internet. The program executed in the projector of the embodiment and the modifications may be preliminarily embedded in a ROM and the like, and then provided.

The program executed in the projector of the embodiment and the modifications consists of modules to provide each of the above-described units on a computer. In actual hardware, a control device reads the program from an external storage device onto a storage device and executes it so that the above-mentioned units are provided on the computer.

According to the embodiments, it is possible to improve the visibility of a projection image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection device, comprising:
    an acquiring unit configured to acquire a first ratio of a second distance to a first distance, the first distance being a distance between a projecting unit that projects a projection image and a first point in a projection area on which the projection image is projected, the second distance being a distance between the projecting unit and a second point in the projection area;
    an estimating unit configured to estimate, using the first ratio, light-or-dark levels of respective division areas into which the projection area is divided; and
    a light-or-dark level processing unit configured to perform light-or-dark level processing on areas in the projection image corresponding respectively to the division areas in accordance with the corresponding light-or-dark level.

2. The image projection device according to claim 1, wherein the light-or-dark level is a second ratio of a distance between the projecting unit and at least one of the division areas to the first distance.

3. The image projection device according to claim 2, wherein the estimating unit estimates the second ratio by linear interpolation or non-linear interpolation.

4. The image projection device according to claim 1, wherein the estimating unit acquires brightness information of the division areas, and calculates the light-or-dark levels of the division areas using the brightness information and the first ratio.

5. The image projection device according to claim 1, wherein the estimating unit acquires a piece of brightness information in accordance with the first ratio among plural pieces of brightness information of the respective division areas, and calculates the light-or-dark level of each of the division areas using the piece of brightness information.

6. The image projection device according to claim 1, further comprising a dividing unit configured to divide the projection area into the division areas in a vertical direction, wherein
    each of the division areas has an equal vertical length.

7. The image projection device according to claim 1, further comprising a dividing unit configured to divide the projection area into the division areas in a vertical direction, wherein
    each of the division areas has a longer vertical length as the division area is farther from the projecting unit.

8. The image projection device according to claim 1, wherein
    the projection image is a color image, and
    the light-or-dark level processing unit converts the color image into signal components defined in a brightness color difference space, and performs the light-or-dark level processing on brightness signals among the converted signal components of the color image.

9. A light-or-dark level processing method, comprising:
    acquiring, by an acquiring unit, a first ratio of a second distance to a first distance, the first distance being a distance between a projecting unit that projects a projection image and a first point in a projection area on which the projection image is projected, the second distance being a distance between the projecting unit and a second point in the projection area;
    estimating, by an estimating unit, light-or-dark levels of respective division areas into which the projection area is divided, using the first ratio; and
    performing, by a light-or-dark level processing unit, light-or-dark level processing on areas in the projection image corresponding respectively to the division areas in accordance with the corresponding light-or-dark level.

10. A non-transitory computer-readable storage medium with an executable program stored thereon, wherein the program instructs a computer to perform:
    acquiring a first ratio of a second distance to a first distance, the first distance being a distance between a projecting unit that projects a projection image and a first point in a projection area on which the projection image is projected, the second distance being a distance between the projecting unit and a second point in the projection area;
    estimating light-or-dark levels of respective division areas into which the projection area is divided, using the first ratio; and
    performing light-or-dark level processing on areas in the projection image corresponding respectively to the division areas in accordance with the corresponding light-or-dark level.

* * * * *